(12) United States Patent
Kao et al.

(10) Patent No.: US 8,803,861 B2
(45) Date of Patent: Aug. 12, 2014

(54) ELECTROMECHANICAL SYSTEMS DEVICE

(75) Inventors: Tsongming Kao, Sunnyvale, CA (US);
Charles Leu, Fremont, CA (US);
Kostadin Djordjev, San Jose, CA (US);
Rihui He, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 287 days.

(21) Appl. No.: 13/403,792

(22) Filed: Feb. 23, 2012

(65) Prior Publication Data

US 2013/0222351 A1   Aug. 29, 2013

(51) Int. Cl.
*G06F 3/038* (2013.01)
*G09G 5/00* (2006.01)

(52) U.S. Cl.
USPC ........................................................ 345/205

(58) Field of Classification Search
None
See application file for complete search history.

(56) References Cited

U.S. PATENT DOCUMENTS

| | | | |
|---|---|---|---|
| 6,040,840 A | 3/2000 | Koshiba et al. | |
| 6,040,937 A | 3/2000 | Miles | |
| 6,288,472 B1 | 9/2001 | Cabuz et al. | |
| 6,288,821 B1 | 9/2001 | Aksyuk et al. | |
| 6,674,090 B1 | 1/2004 | Chua et al. | |
| 6,674,562 B1 | 1/2004 | Miles et al. | |
| 7,119,945 B2 | 10/2006 | Kothari et al. | |
| 7,123,216 B1 | 10/2006 | Miles | |
| 7,324,176 B2 | 1/2008 | Dunn et al. | |
| 7,327,510 B2 | 2/2008 | Cummings et al. | |
| 7,999,995 B2 | 8/2011 | Hashimura et al. | |
| 2006/0077126 A1 | 4/2006 | Kothari | |
| 2007/0041703 A1 | 2/2007 | Wang | |
| 2008/0279498 A1* | 11/2008 | Sampsell et al. | 385/8 |
| 2009/0231275 A1 | 9/2009 | Odgers | |
| 2009/0231325 A1 | 9/2009 | Suzuki et al. | |

FOREIGN PATENT DOCUMENTS

| | | |
|---|---|---|
| EP | 1640337 A2 | 3/2006 |
| EP | 1990671 A2 | 11/2008 |
| WO | WO-2008140926 A2 | 11/2008 |

OTHER PUBLICATIONS

International Search Report and Written Opinion—PCT/US2013/026808—ISA/EPO—May 7, 2013.

* cited by examiner

*Primary Examiner* — Nicholas Lee
(74) *Attorney, Agent, or Firm* — Knobbe Martens Olson & Bear LLP

(57) ABSTRACT

This disclosure provides systems, methods and apparatus for EMS devices. In one aspect, an EMS device includes an array of display elements and a plurality of driver lines with at least a portion of the plurality of driver lines routed above or below the array between one or more driver circuits and the array. In some implementations, at least a portion of the plurality of driver lines is disposed above a non-active area of the array. In one aspect, an EMS device can form a portion of at least one of the plurality of driver lines. In some implementations, movable layers of the array can be disposed between at least a portion of the plurality of driver lines and stationary electrodes of the display.

24 Claims, 16 Drawing Sheets

| Segment Voltages | Common Voltages | | | | |
|---|---|---|---|---|---|
| | $VC_{ADD\_H}$ | $VC_{HOLD\_H}$ | $VC_{REL}$ | $VC_{HOLD\_L}$ | $VC_{ADD\_L}$ |
| $VS_H$ | Stable | Stable | Relax | Stable | Actuate |
| $VS_L$ | Actuate | Stable | Relax | Stable | Stable |

# ELECTROMECHANICAL SYSTEMS DEVICE

TECHNICAL FIELD

This disclosure relates to the routing of driver lines in electromechanical systems.

DESCRIPTION OF THE RELATED TECHNOLOGY

Electromechanical systems (EMS) include devices having electrical and mechanical elements, actuators, transducers, sensors, optical components (including mirrors) and electronics. EMS can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography and/or other micromachining processes that etch away parts of substrates and/or deposited material layers, or that add layers to form electrical and electromechanical devices.

One type of EMS device is called an interferometric modulator (IMOD). As used herein, the term IMOD or interferometric light modulator refers to a device that selectively absorbs and/or reflects light using the principles of optical interference. In some implementations, an IMOD may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the IMOD. IMOD devices have a wide range of applications, and are anticipated to be used in improving existing products and creating new products, especially those with display capabilities.

In some implementations, EMS devices can include an array of IMODs which can receive electrical signals from one or more driver circuits. The one or more driver circuits can be electrically coupled to the array by a plurality of driver lines that are routed between the array and the one or more driver circuits. The routing of driver lines can require a geometric area or footprint that is larger than the active area of the array. Thus, the active area of the array can be limited by the routing of driver lines, in some implementations.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus including an array of display elements defining an array footprint. The array of display elements includes a plurality of movable layers extending in a first direction, a plurality of stationary electrodes extending in a second direction, a plurality of electrical connection pads, and a plurality of driver lines. The plurality of movable layers and stationary electrodes form a portion of a plurality of the display elements. Each connection pad is disposed at an end of a movable layer. Each driver line has a first end connected to a connection pad and a second end connectable to a driver circuit. At least a portion of the plurality of driver lines is routed within the footprint of the array above or below the array.

In one aspect, at least a portion of the plurality of driver lines can be disposed above a non-active area of the array and the stationary electrodes can be disposed between the movable layers and the portion of the plurality of driver lines disposed over the non-active area of the array. In one aspect, at least a portion of the plurality of driver lines can be disposed over an active area of the array. The apparatus can include an electrically conductive optical mask structure disposed over the array and extending between at least some of the display elements to mask non-active areas of the display. The optical mask structure can form a portion of at least one of the plurality of driver lines. In one aspect, the plurality of movable layers can be disposed between the plurality of stationary electrodes and at least a portion of the plurality of driver lines. In one aspect, the apparatus can include a at least one passivation layer and at least a portion of the plurality of driver lines can be disposed over the at least one passivation layer. In one aspect, the display elements can be interferometric modulators (IMODs).

Another innovative aspect of the subject matter described in this disclosure can be implemented in an apparatus including an array of display elements defining an array footprint. The array of display elements includes a plurality of movable layers extending in a first direction, a plurality of stationary electrodes extending in a second direction, a plurality of electrical connection pads, and means for electrically connecting each of the plurality of movable layers to a driver circuit. Each connection pad is disposed at an end of a movable layer. The electrical connection means is electrically connected to a connection pad and connectable to the driver circuit. At least a portion of the electrical connection means is routed within the footprint of the array above or below the array from the driver circuit to the connection pads. In one aspect, the electrical connection means can include a plurality of driver lines each having a first end connected to a connection pad and a second end connectable to the driver circuit.

Another innovative aspect of the subject matter described in this disclosure can be implemented in a method of manufacturing an apparatus including forming an array of display elements defining an array footprint. Forming the array of display elements includes forming a plurality of movable layers extending in a first direction and a plurality of stationary electrodes extending in a second direction, forming an electrical connection pad at an end of each movable layer, and forming a plurality of driver lines each having a first end connected to a connection pad and a second end connectable to a driver circuit. At least a portion of the plurality of driver lines passes within the footprint of the array above or below the array from the driver circuit to the connection pads.

In one aspect, at least a portion of the plurality of driver lines can be formed in a non-active area of the array and the stationary electrodes can be disposed between the movable layers and the portion of the plurality of driver lines disposed over the non-active area of the array. The method can include forming an electrically conductive optical mask structure over the array and extending between at least some of the display elements to mask non-active areas of the display. Forming the optical mask structure can include forming a portion of at least one of the plurality of driver lines. In one aspect, the plurality of movable layers can be formed between the stationary electrodes and at least a portion of the plurality of driver lines. In one aspect, forming the plurality of movable layers and the plurality of stationary electrodes can include forming a plurality of interferometric modulator (IMODs) display elements.

Details of one or more implementations of the subject matter described in this specification are set forth in the accompanying drawings and the description below. Although the examples provided in this disclosure are primarily described in terms of electromechanical systems (EMS) and microelectromechanical systems (MEMS)-based displays, the concepts provided herein may apply to other types of displays, such as liquid crystal displays, organic light-emitting diode ("OLED") displays and field emission displays. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
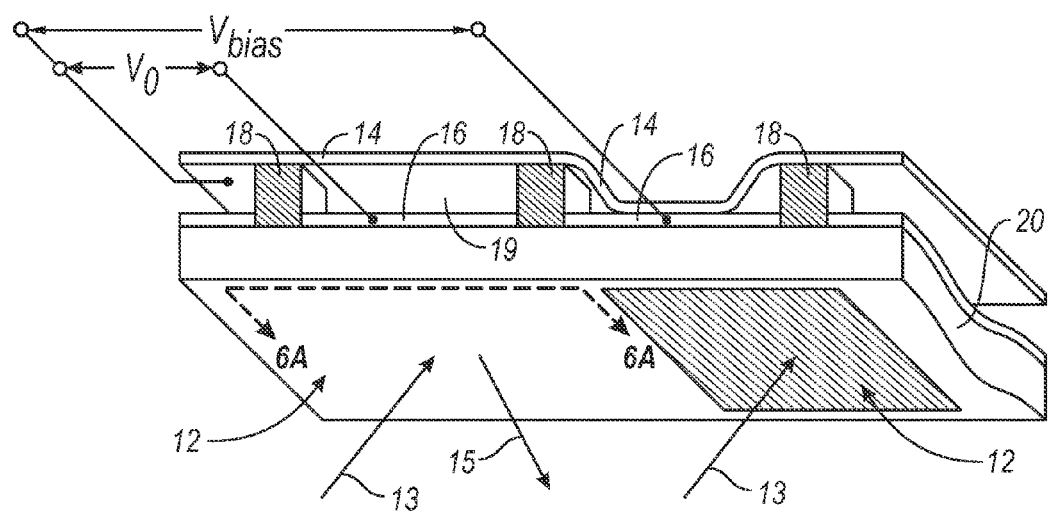
FIG. 1 shows an example of an isometric view depicting two adjacent pixels in a series of pixels of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some implementations, a plurality of display elements can be configured in an array formed by a plurality of movable layers arranged in line segments (such as rows) and by a plurality of stationary electrodes arranged in line segments (such as columns) which overlap the movable layers. The resulting array can form an optical display. In such implementations, each display element can be driven between at least a relaxed state and an actuated state by one or more driver circuits that are electrically coupled to the movable layer line segments and the stationary electrode line segments. In this way, a voltage can be applied between the movable layer and the stationary electrode of a single display element to selectively drive the movable layer. To electrically couple the one or more driver circuits with the movable layers and stationary electrodes, a plurality of driver lines can be routed between each movable layer line segment and a driver circuit and between each stationary electrode line segment and a driver circuit. In some implementations, the movable layers and the stationary electrodes can be electrically coupled to a single driver circuit. In some other implementations, an EMS device can include a first driver circuit that is electrically coupled to each of the movable layer line segments and a second driver circuit that is electrically coupled to each of the stationary electrode line segments.

In existing EMS devices, driver lines are typically routed on the sides of an array of display elements resulting in a "routing border" around the footprint of the array. In other words, driver lines are typically not routed above or below an array but are instead routed alongside the array to electrically couple one or more drivers with the sides of the array. As used herein, the footprint of an array refers to the area of the array formed by the display elements of the array. For example, the footprint of an array can be the outer-boundary of the array formed by the display elements of the array. The area or width of such a routing border can increase as the size of the display increases because more routing lines are required as the number of line segments of movable layers and/or line segments of stationary electrodes increases. In some implementations, it can be useful to minimize the size of the routing border of an EMS device such that a display area can be maximized within a given area or footprint. In some implementations disclosed herein, driver lines are routed at least partially above or below an array of display elements to reduce the size of the routing border on the sides of the display. That is to say, in some implementations, driver lines may be routed above or below at least some of the display elements of an array as opposed to exclusively along the lateral sides of the display. In this way, a larger array can fit within a given area or footprint because the associated routing border requires less space.

Particular implementations of the subject matter described in this disclosure can be implemented to realize one or more of the following potential advantages. For example, EMS devices including driver lines routed at least partially within an array can reduce the width of any routing border associated with the array. Reducing the width of a routing border associated with an array of display elements allows larger arrays to be positioned within a given footprint or area. Additionally, reducing the width of a routing border associated with an array of display elements allows for a given array to be placed within a smaller housing than a similarly sized array that is electrically coupled to a driver circuit by driver lines that are routed completely outside of the array. Reducing the size of a display housing also can lead to lower material costs for producing the EMS device and can be more aesthetically pleasing for users (such as resulting in slimmer housing borders and/or trims around the display). Reducing the width of a routing border associated with an array of display elements also can enable more compact and/or slimmer display designs. Such designs can yield more EMS display devices on a given size of substrate reducing the cost of the device. Further, such designs can result in EMS display devices with form factors compatible to other incumbent products in the display market.

An example of a suitable EMS or MEMS device, to which the described implementations may apply, is a reflective display device. Reflective display devices can incorporate IMODs to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the IMOD. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an IMOD display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent IMODs 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
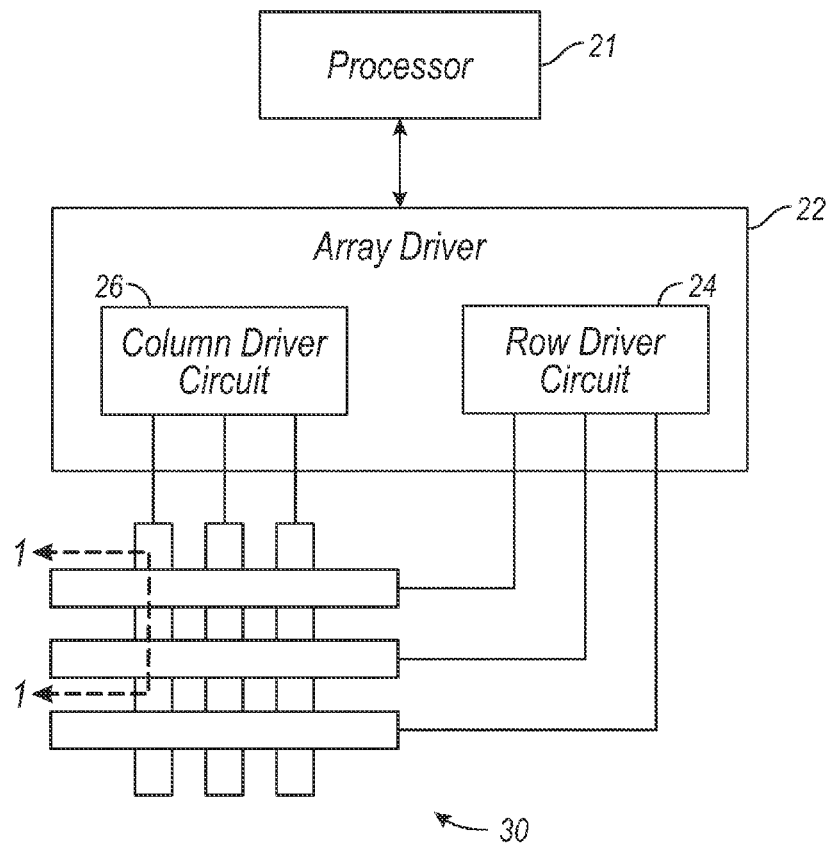
FIG. 2 shows an example of a system block diagram illustrating an electronic device incorporating a 3×3 IMOD display.

FIG. 2 shows an example of a system block diagram illustrating an electronic device incorporating a 3×3 IMOD display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
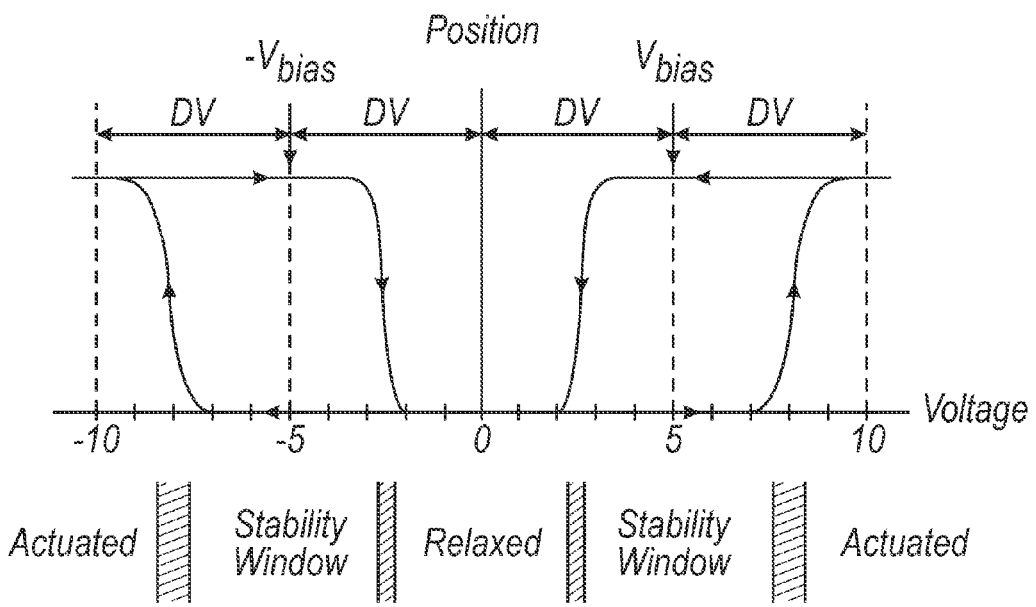
FIG. 3 shows an example of a diagram illustrating movable reflective layer position versus applied voltage for the IMOD of FIG. 1.
FIG. 4 shows an example of a table illustrating various states of an IMOD when various common and segment voltages are applied.

FIG. 3 shows an example of a diagram illustrating movable reflective layer position versus applied voltage for the IMOD of FIG. 1. For MEMS IMODs, the row/column (i.e., common/segment) write procedure may take advantage of a hysteresis property of these devices as illustrated in FIG. 3. An IMOD may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an IMOD when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all IMOD elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the IMOD will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
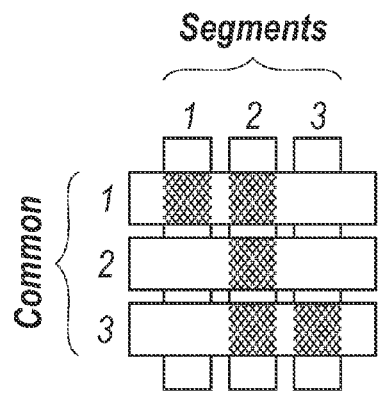
FIG. 5A shows an example of a diagram illustrating a frame of display data in the 3×3 IMOD display of FIG. 2.
Figure 5B:
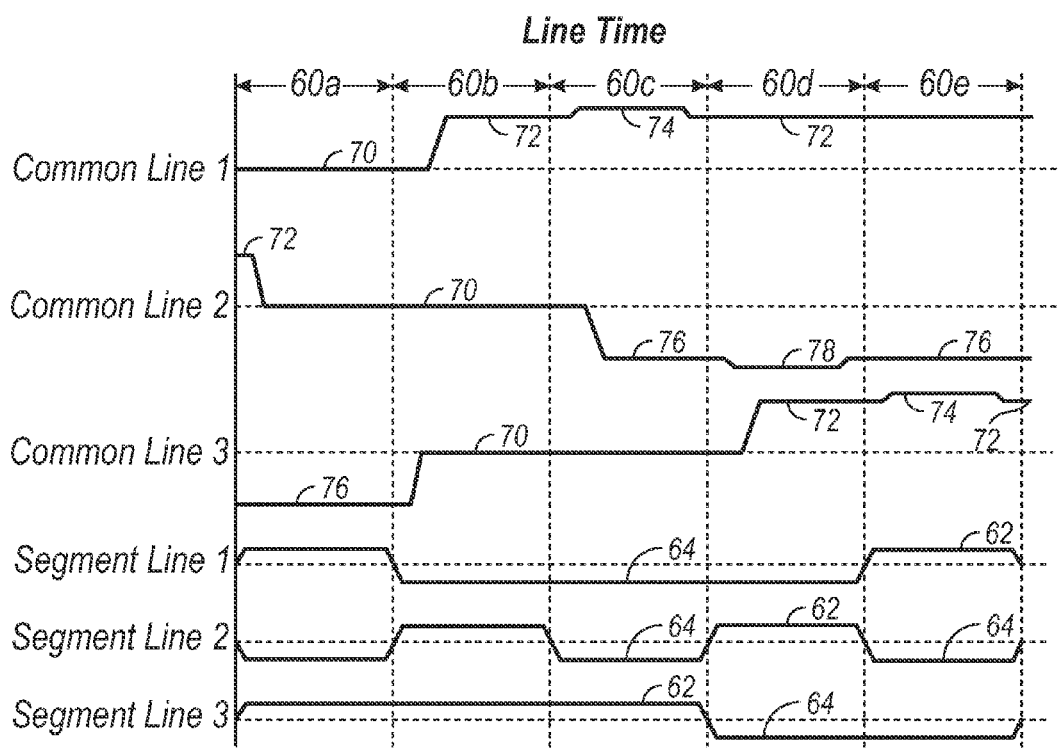
FIG. 5B shows an example of a timing diagram for common and segment signals that may be used to write the frame of display data illustrated in FIG. 5A.

FIG. 5A shows an example of a diagram illustrating a frame of display data in the 3×3 IMOD display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the IMODs, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
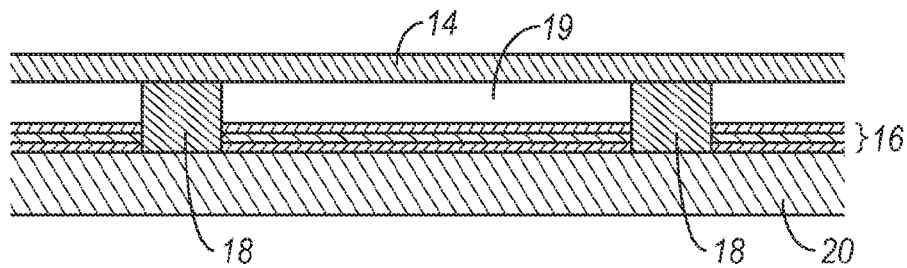
FIG. 6A shows an example of a partial cross-section of the IMOD display of FIG. 1.
Figure 6B:
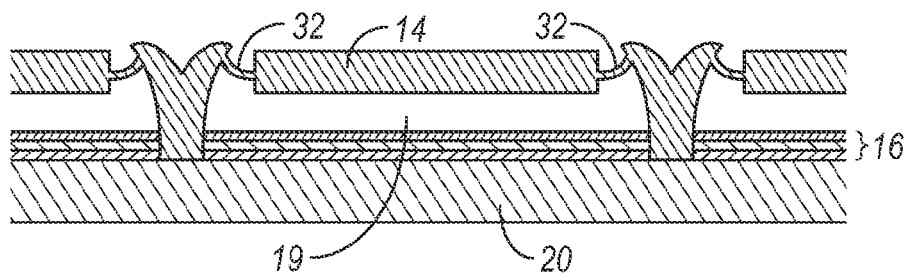
FIGS. 6B-6E show examples of cross-sections of varying implementations of IMODs.
Figure 6C:
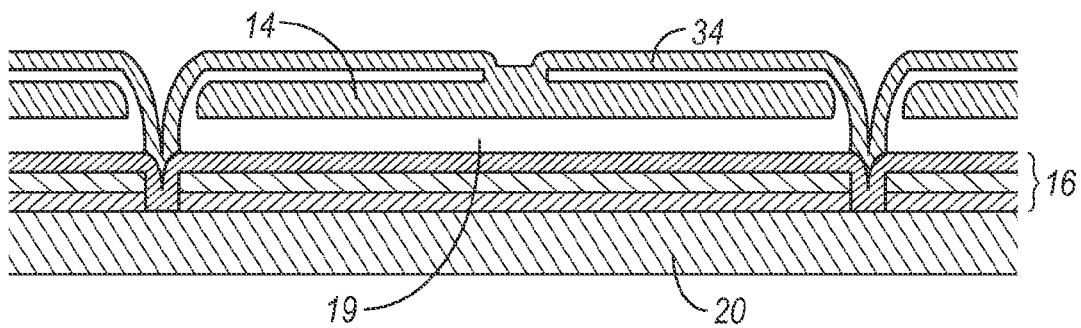

The details of the structure of IMODs that operate in accordance with the principles set forth above may vary widely. For example, FIGS. 6A-6E show examples of cross-sections of varying implementations of IMODs, including the movable reflective layer 14 and its supporting structures. FIG. 6A shows an example of a partial cross-section of the IMOD display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
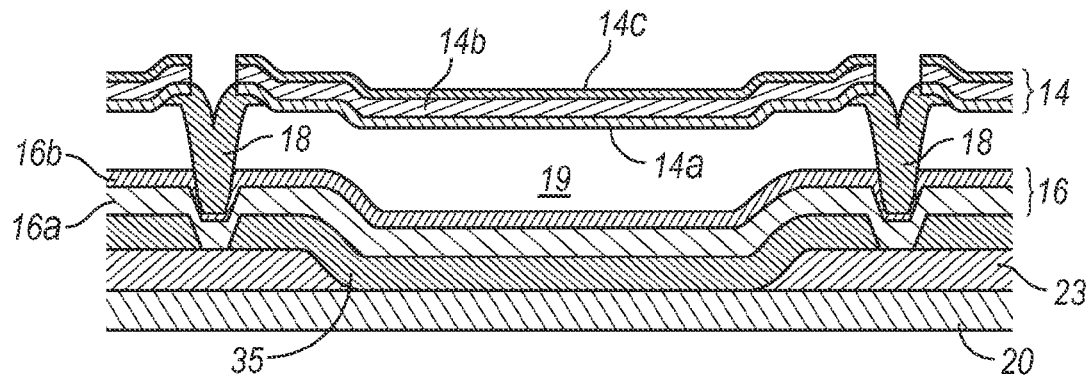

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a SiO$_2$/SiON/SiO$_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a and 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer and an aluminum alloy that serves as a reflector and a bussing layer, with a thickness in the range of about 30-80 Å, 500-1000 Å and 500-6000 Å, respectively. The one or more layers can be patterned using a variety of techniques, including photolithography and dry etching, including, for example, carbon tetrafluoride (CF$_4$) and/or oxygen (O$_2$) for the MoCr and SiO$_2$ layers and chlorine (Cl$_2$) and/or boron trichloride (BCl$_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
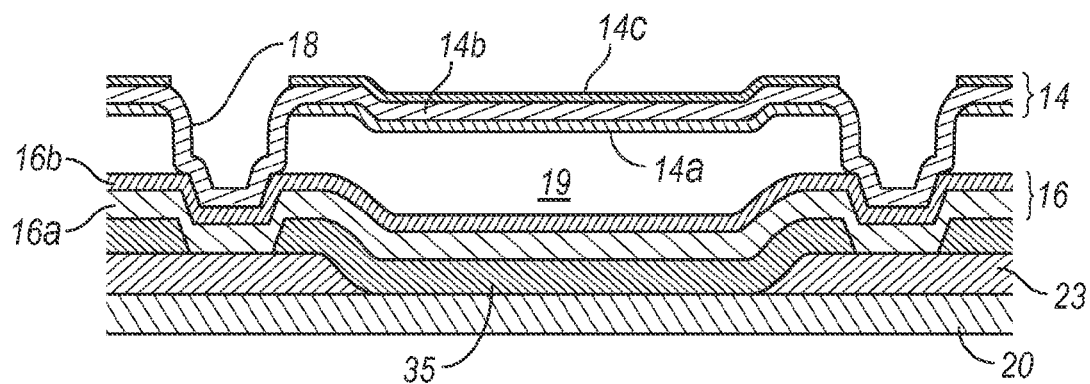

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the IMOD is insufficient to cause actuation. The optical stack 16, which may contain a plurality of several different layers, is shown here for clarity including an optical absorber 16a and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as patterning.

Figure 7:
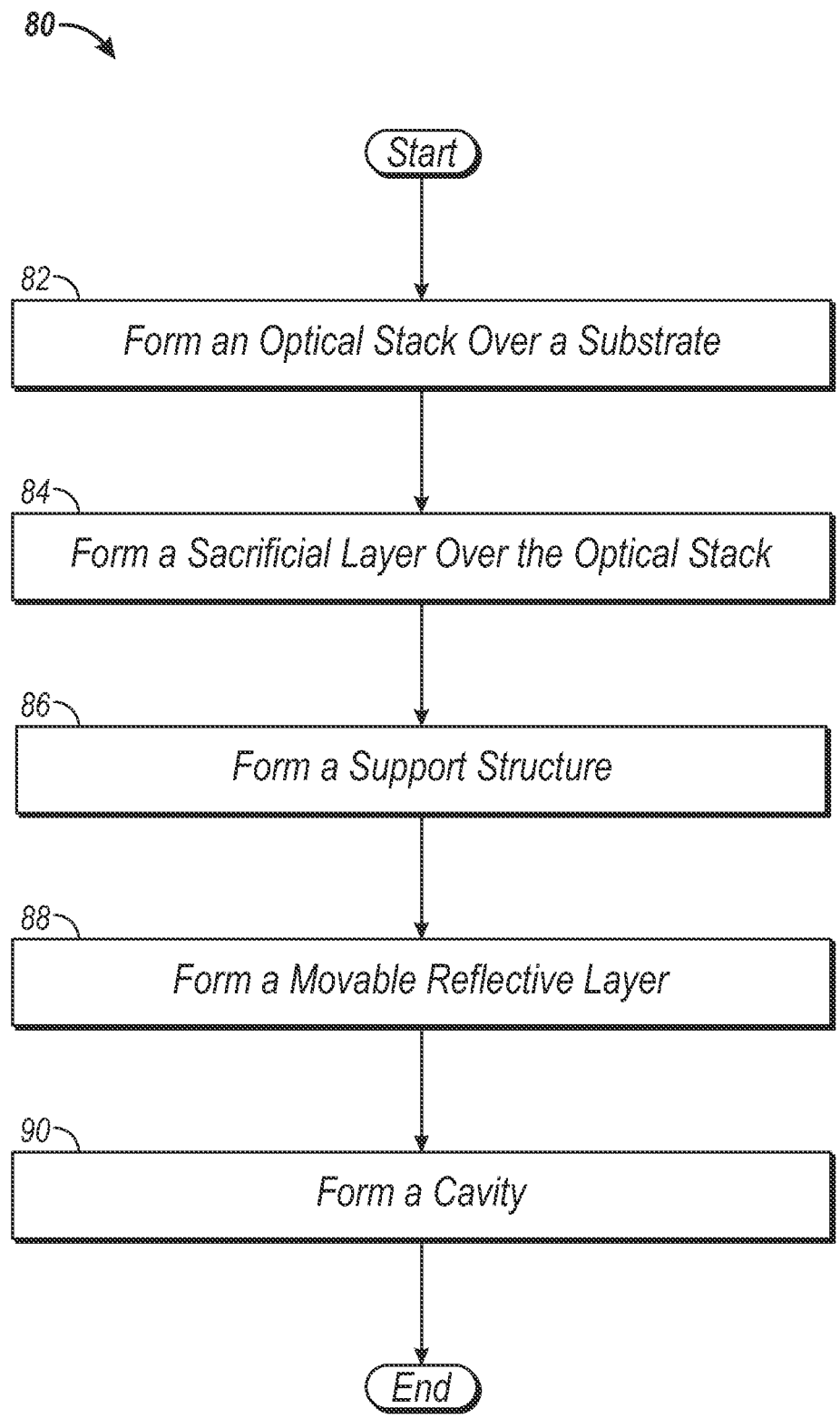
FIG. 7 shows an example of a flow diagram illustrating a manufacturing process for an IMOD.
Figure 8A:
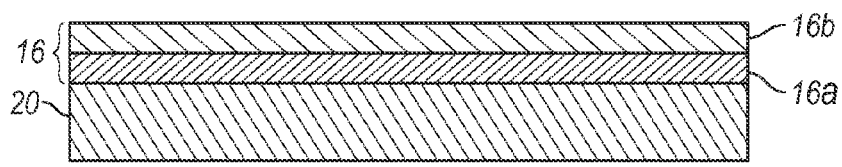
FIGS. 8A-8E show examples of cross-sectional schematic illustrations of various stages in a method of making an IMOD.

FIG. 7 shows an example of a flow diagram illustrating a manufacturing process 80 for an IMOD, and FIGS. 8A-8E show examples of cross-sectional schematic illustrations of corresponding stages of such a manufacturing process 80. In some implementations, the manufacturing process 80 can be implemented to manufacture, e.g., IMODs of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a and 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
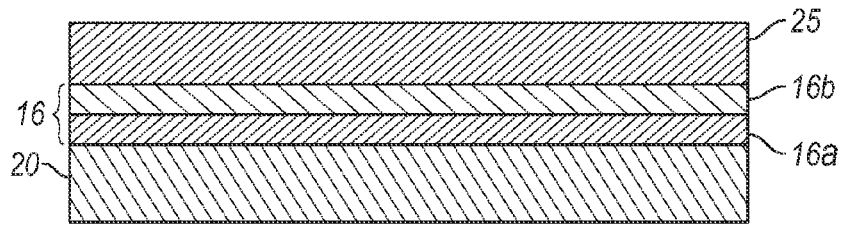

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting IMODs 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride (XeF$_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
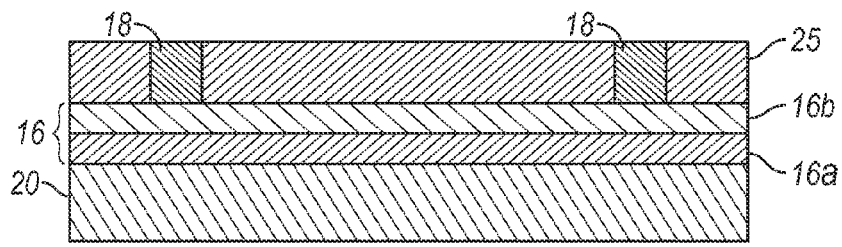

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
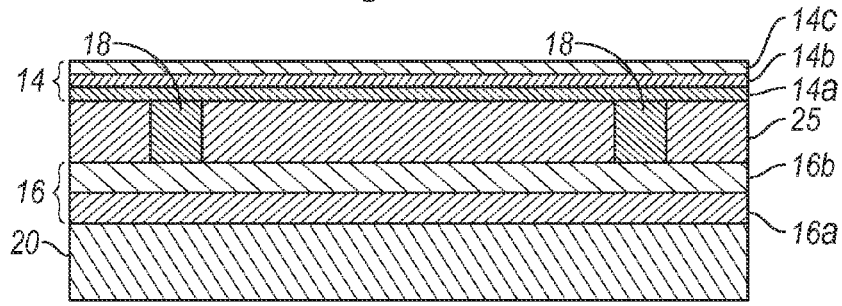
Figure 8E:
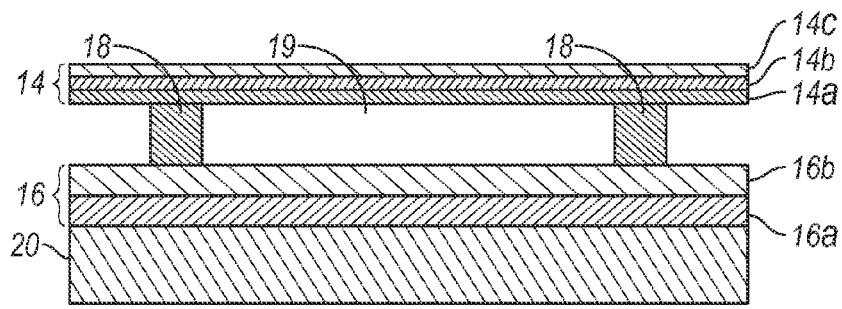

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking and/or etching steps. The movable reflective layer 14 can be electrically conductive, and referred to as an electrically conductive layer. In some implementations, the movable reflective layer 14 may include a plurality of sub-layers 14a, 14b and 14c as shown in FIG. 8D. In some implementations, one or more of the sub-layers, such as sub-layers 14a and 14c, may include highly reflective sub-layers selected for their optical properties, and another sub-layer 14b may include a mechanical sub-layer selected for its mechanical properties. Since the sacrificial layer 25 is still present in the partially fabricated IMOD formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9:
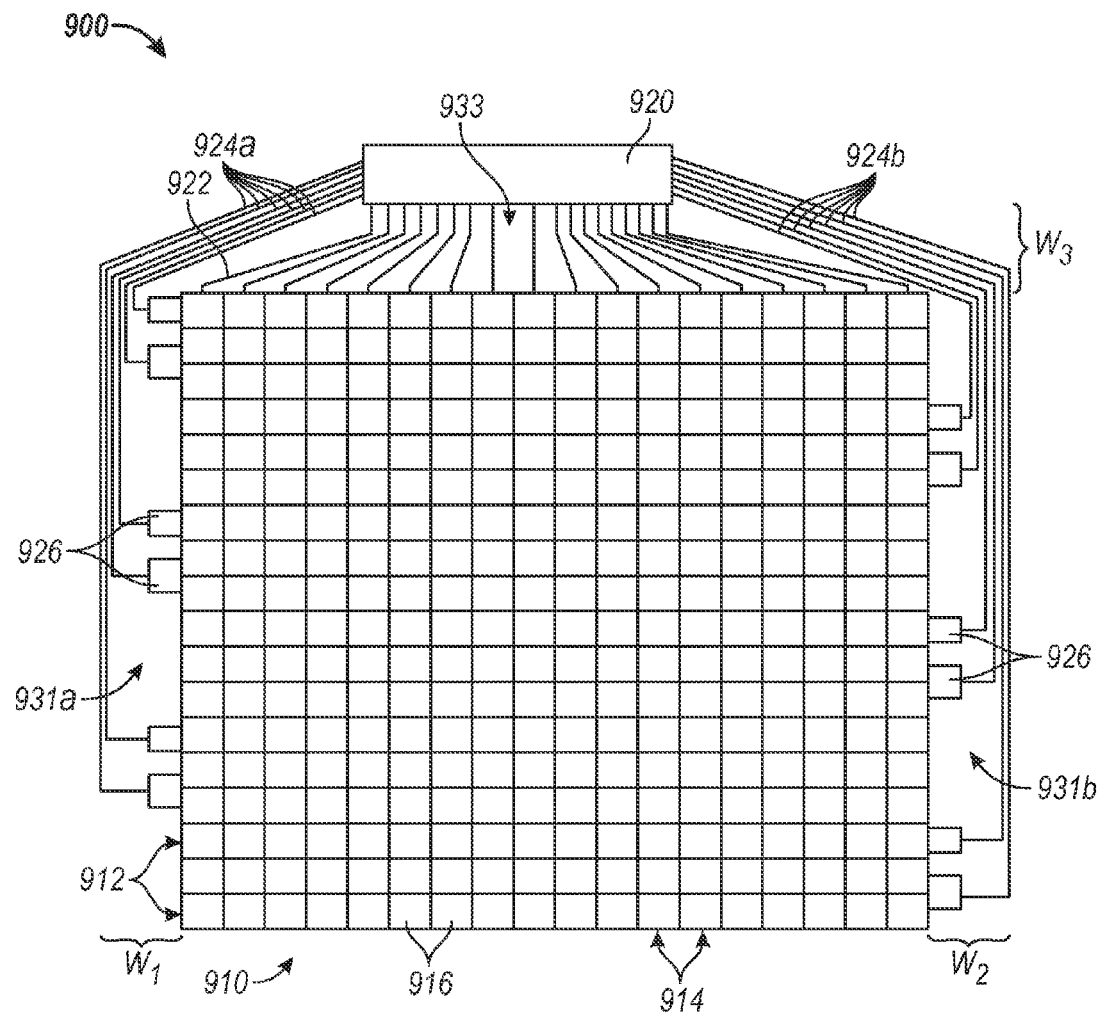
FIG. 9 shows an example of a top plan view of an EMS device including an array of display elements, a driver circuit and a plurality of driver lines routed alongside of the array between the array and the driver circuit.

FIG. 9 shows an example of a top plan view of an EMS device 900 including an array 910 of display elements 916, a driver circuit 920 and a plurality of driver lines 922, 924a and 924b routed alongside of the array 910 between the array 910 and the driver circuit 920. In some implementations, the array 910 includes a plurality of rows 912 and a plurality of columns 914. As discussed above, although portions of the array 910 may be referred to in some instances as "rows" or "columns," a person having ordinary skill in the art will readily understand that referring to one direction as a "row" and another as a "column" is arbitrary. Restated, in some orientations, the rows 912 can be considered columns, and the columns 914 considered to be rows. Furthermore, the display elements 916 may be evenly arranged in orthogonal rows 912 and columns 914 (as shown), or arranged in non-linear configurations, for example, having certain positional offsets with respect to one another (a "mosaic"). The terms "array" and "mosaic" may refer to either configuration. Thus, although the EMS device 900 is referred to as including an "array" 910 the display elements 916 themselves need not be arranged orthogonally to one another, or disposed in an even distribution, in any instance, but may include arrangements having asymmetric shapes and unevenly distributed elements.

Still referring to FIG. 9, the overlapping portions of the rows 912 and columns 914 can define the individual display elements 916 of the array 910. In some implementations, the rows 912 can include movable layers configured to move relative to the columns 914 when a voltage is applied therebetween. In this way, the movable layer of each display element 916 can move between at least a relaxed state and an actuated state to reflect different wavelengths of light. In some implementations, the driver circuit 920 is electrically coupled to each of the rows 912 and columns 914 such that the driver circuit 920 can apply a signal to one or more rows 912 and to one or more columns 914. In this way, a voltage can be applied between the row 912 and the column 914 of a single display element 916 to selectively drive the row 912 or column 914 relative to the other.

In some implementations, the rows 912 are electrically coupled to the driver circuit 920 by a plurality of driver lines 924a and 924b. As shown, each driver line 924a and 924b is routed between the driver circuit 920 and a connection pad 926. The connection pads 926 are electrically connected to an end of each row 912 such that a signal can be applied to each row 912 via the driver lines 924a and 924b.

In some implementations, a first group of driver lines 924a can be routed to a group of rows 912 from the driver circuit 920 along a first lateral side of the array 910. As shown in FIG. 9, the routing of the driver lines 924a along the first side of the array 910 creates a routing border 931a having a width dimension $W_1$. Additionally, a second group of driver lines 924b can be routed to a group of rows 912 from the driver circuit 920 along a second lateral side of the array 910. The routing of the driver lines 924b along the second side of the array 910 creates a routing border 931b having a width dimension $W_2$. Another group of driver lines 922 can be routed to the columns 914 from the driver circuit 920 along a third lateral side of the array 910. The routing of the driver lines 922 along the third side of the array 910 creates a routing border 933 having a width dimension $W_3$. As discussed above, the width dimensions $W_1$, $W_2$ and $W_3$ of the routing borders 931a, 931b and 933 can increase as the size of the array 910 increases because more routing lines 922, 924a and 924b are required as the number of rows 912 and/or the number of columns 914 increases. Thus, it can be useful to minimize the size of any routing borders of an EMS device such that the area of an array of the EMS device can be maximized within a given area or footprint.

Figure 10A:
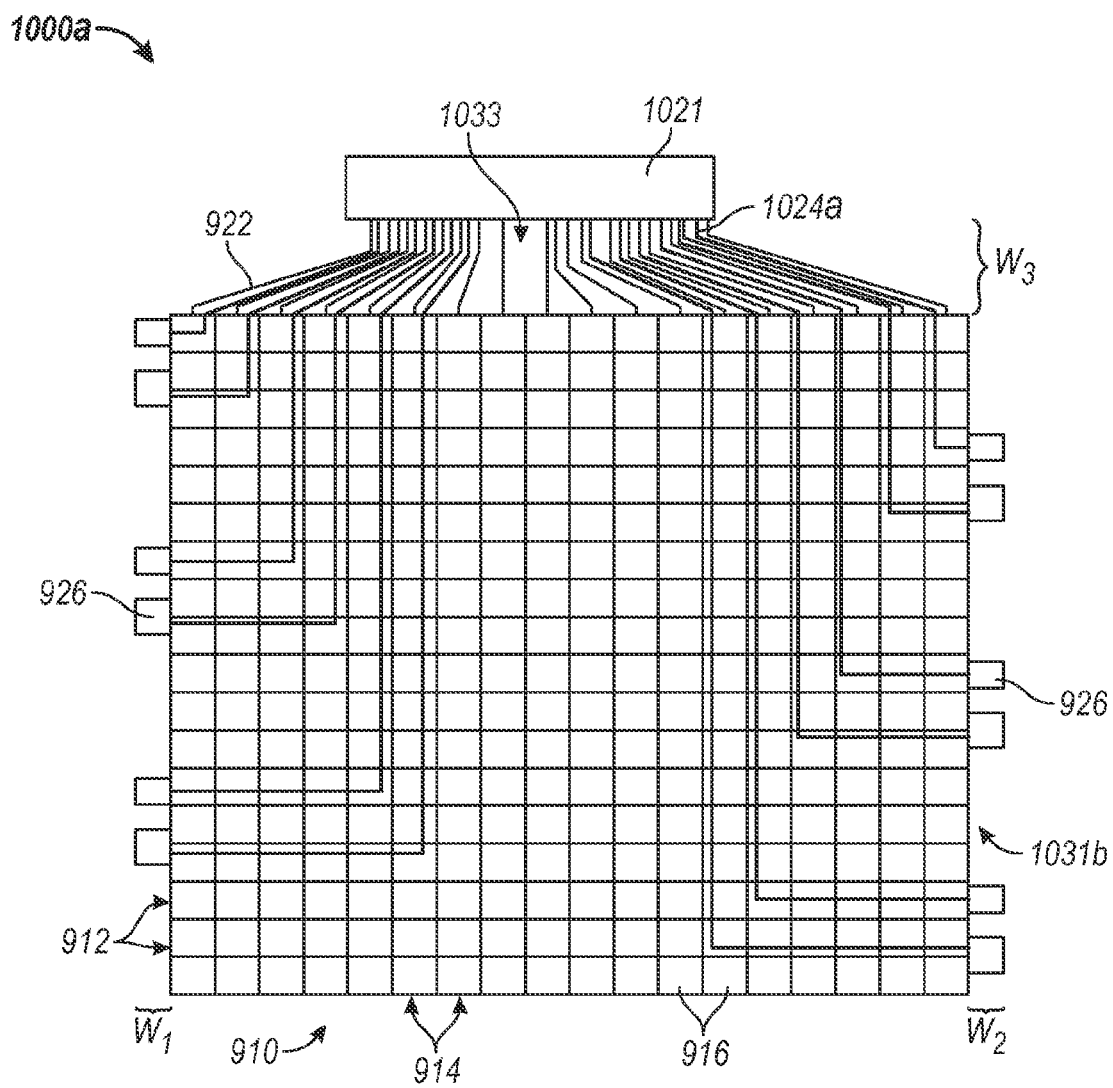
FIG. 10A shows an example of a bottom plan view of an EMS device including the array of display elements of FIG. 9, a driver circuit and a plurality of driver lines routed at least partially below the array and between the array and the driver circuit.

FIG. 10A shows an example of a bottom plan view of an EMS device 1000a including the array 910 of display elements 916 of FIG. 9, a driver circuit 1021 and a plurality of driver lines 1024a routed at least partially below the array 910 and between the array 910 and the driver circuit 1021. Similar to the EMS device 900 of FIG. 9, the columns 914 are electrically coupled to the driver circuit 1021 by a plurality of driver lines 922. The routing of the driver lines 922 between the driver circuit 1021 and the columns 914 creates a routing border 1033 having a width dimension $W_3$.

In some implementations, the rows 912 are electrically coupled to the driver circuit 1021 by the plurality of driver lines 1024a. In contrast to the EMS device 900 of FIG. 9, at least a portion of each driver line 1024a is routed from the driver circuit 1021 underneath the array 910 (e.g., at least partially within the footprint of the area) to a connection pad 926 that is electrically coupled to an end of a row 912. As shown by comparing FIGS. 9 and 10A, the total area required by the routing borders for an EMS device can be reduced by routing driver lines at least partially above or below an array of display elements instead of exclusively at the sides of the array. For example, because the driver lines 1024a are routed at least partially underneath the array 910, the driver lines 1024a do not contribute to the width dimensions $W_1$ and $W_2$ of the routing borders 1031a and 1031b on the lateral sides of the array 910 where the connection pads 926 are disposed. As a result, the width dimensions $W_1$ and $W_2$ of the routing borders 1031a and 1031b are significantly less than the width dimensions of the routing borders 931a and 931b of the EMS device 900 of FIG. 9. Accordingly, the EMS device 1000a of FIG. 10A can fit within a smaller footprint or area than the EMS device 900 of FIG. 9 even though the arrays 910 of each device are similarly sized. Alternatively, the driver line 1024a routing of FIG. 10A can be used to fit a larger array within the same footprint or area as the EMS device 900 of FIG. 9 because less area is required for the routing borders 1031a and 1031b.

Figure 10B:
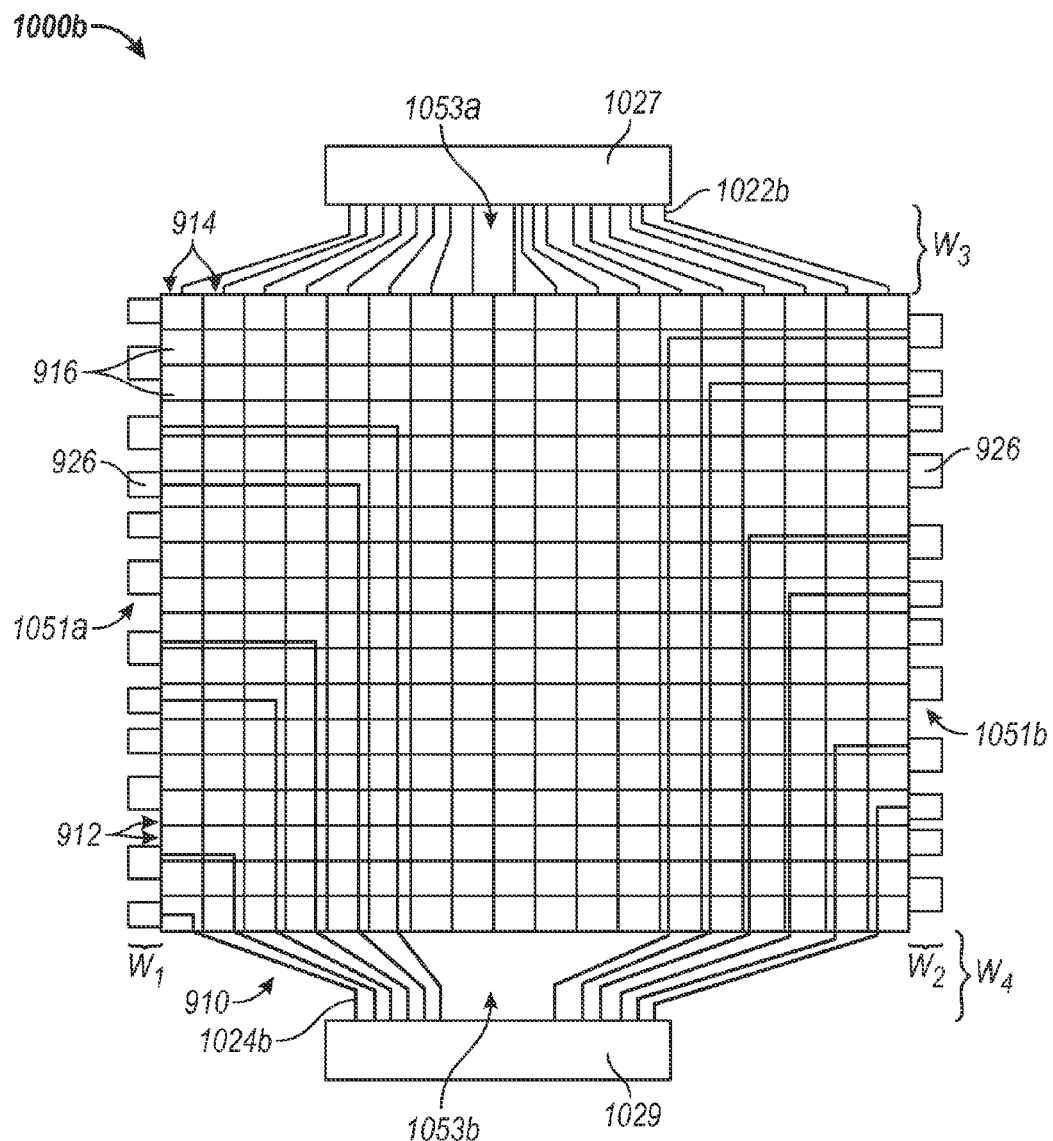
FIG. 10B shows an example of a bottom plan view of an EMS device including the array of display elements of FIG. 9, a first driver circuit, a second driver circuit and a plurality of driver lines routed at least partially below the array and between the array and the second driver circuit.

FIG. 10B shows an example of a bottom plan view of an EMS device 1000b including the array 910 of display elements 916 of FIG. 9, a first driver circuit 1027, a second driver circuit 1029 and a plurality of driver lines 1024b routed at least partially below the array 910 between the array 910 and the second driver circuit 1029. In contrast to the EMS device 1000a of FIG. 10A, the EMS device 1000b includes two driver circuits: a first driver circuit 1027 electrically coupled to the columns 914 by a plurality of driver lines 1022b and a second driver circuit 1029 electrically coupled to the rows 912 by a plurality of driver lines 1024b. As a result, the EMS device 1000b includes a routing border 1053a disposed between the first driver circuit 1027 and the array 910 and having a width dimension $W_3$ defined by the distance between the first driver circuit 1027 and the array 910. On the other side of the EMS device 1000b, a routing border 1053b is disposed between the second driver circuit 1029 and the array 910 and has a width dimension $W_4$ defined by the distance between the second driver circuit 1029 and the array 910. The EMS device 1000b also includes routing borders 1051a and 1051b having width dimensions $W_1$ and $W_2$, respectively, defined by the lateral dimensions of the connection pads 926 at the end of each row 912.

As with the EMS device 1000a of FIG. 10A, because the driver lines 1024b are routed at least partially underneath the array 910, the driver lines 1024b do not contribute to the width dimensions $W_1$ and $W_2$ of the routing borders 1051a and 1051b on the lateral sides of the array 910 where the connection pads 926 are disposed. As a result, the width dimensions $W_1$ and $W_2$ of the routing borders 1051a and 1051b are significantly less than the width dimensions of the routing borders 931a and 931b of the array 910 of FIG. 9. Accordingly, the EMS device 1000b of FIG. 10B can incorporate separate driver circuits 1027 and 1029 for the rows 912 and columns 914 of the array 910 while still fitting within a smaller footprint or area than the EMS device 900 of FIG. 9.

Figure 10C:
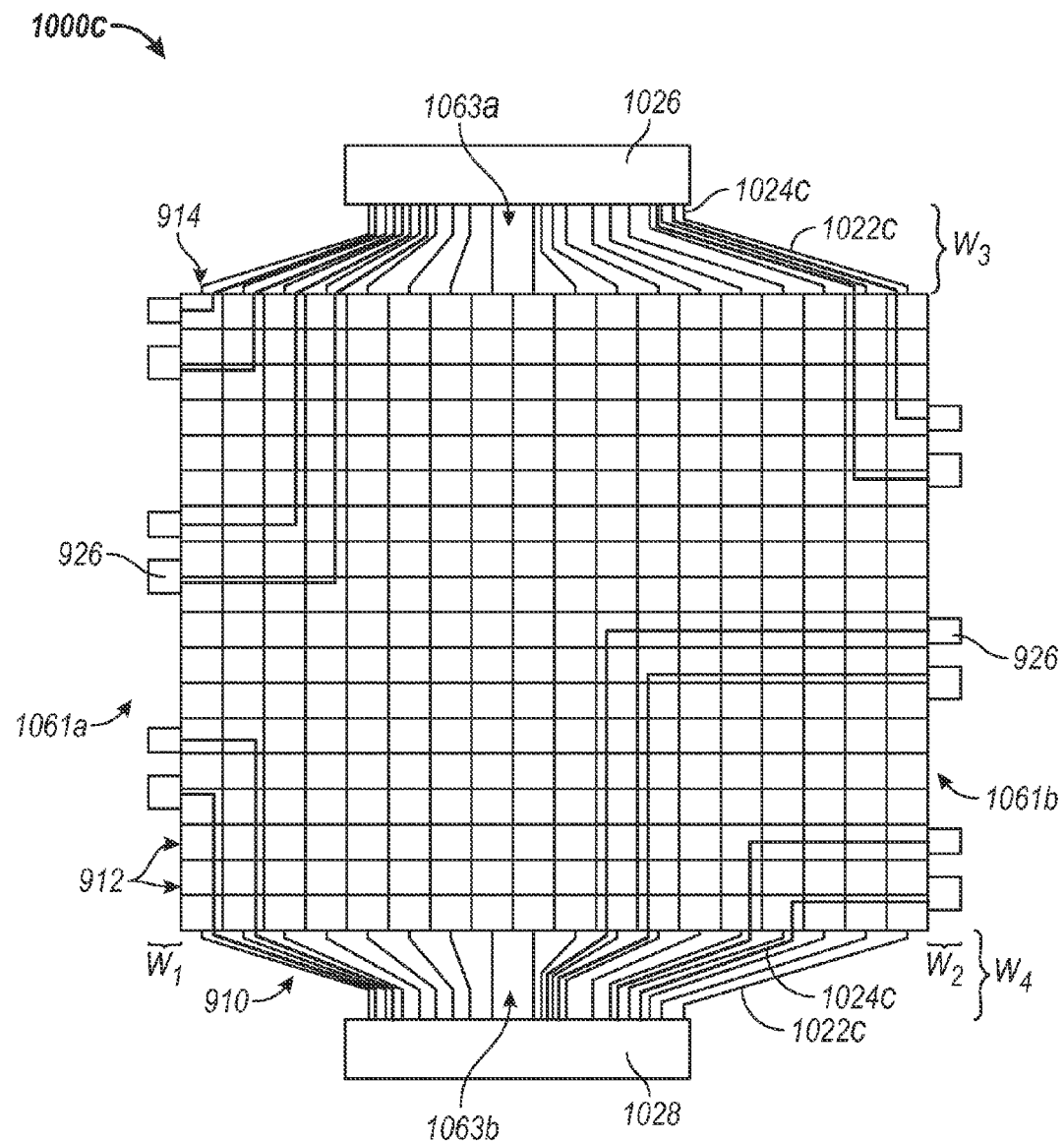
FIG. 10C shows an example of a bottom plan view of another EMS device including the array of display elements of FIG. 9, a first driver circuit, a second driver circuit and a plurality of driver lines routed at least partially below the array and between the array and one of the first driver circuit and the second driver circuit.

FIG. 10C shows an example of a bottom plan view of another EMS device 1000c including the array 910 of display elements 916 of FIG. 9, a first driver circuit 1026, a second driver circuit 1028 and a plurality of driver lines 1024c routed at least partially below the array 910 between the array 910 and one of the first driver circuit 1026 the second driver circuit 1028. In contrast to the EMS device 1000b of FIG. 10B, each of the first driver circuit 1026 and the second driver circuit 1028 is connected to at least some of the rows 912 of the array 910 of display elements 916 and to the columns 914 of the array 910. In this way, the first driver circuit 1026 and the second driver circuit 1028 can apply signals to one or more rows 912 and/or to one or more columns 914 of the array 910. As a result, the EMS device 1000c includes a routing border 1063a disposed between the first driver circuit 1026 and the array 910 and having a width dimension $W_3$ defined by the distance between the first driver circuit 1026 and the array 910. On the other side of the EMS device 1000c, a routing border 1063b is disposed between the second driver circuit 1028 and the array 910 and has a width dimension $W_4$ defined by the distance between the second driver circuit 1028 and the array 910. The EMS device 1000c also includes routing borders 1061a and 1061b having width dimensions $W_1$ and $W_2$, respectively, defined by the lateral dimensions of the connection pads 926 at the end of each row 912.

As with the EMS device 1000b of FIG. 10B, because the driver lines 1024c are routed at least partially underneath the array 910, the driver lines 1024c do not contribute to the width dimensions $W_1$ and $W_2$ of the routing borders 1061a and 1061b on the lateral sides of the array 910 where the connection pads 926 are disposed. Accordingly, the EMS device 1000c of FIG. 10C can incorporate separate driver circuits 1026 and 1028 each connected to at least some of the rows 912 and columns 914 of the array 910 while still fitting within a smaller footprint or area than the EMS device 900 of FIG. 9.

Figure 11A:
FIGS. 11A-11H show cross-sectional views of an example process of manufacturing an EMS device having a plurality of driver lines routed at least partially below an array of display elements.

FIGS. 11A-11H show cross-sectional views of an example process of manufacturing an EMS device having a plurality of driver lines routed at least partially below an array of display elements. FIG. 11A illustrates an example array 1103 disposed upon a front substrate layer 1101. In some implementations, the front substrate layer 1101 can be a transparent substrate such as glass or plastic, it may be flexible or relatively stiff and unbending, and may have been subjected to prior preparation processes, e.g., cleaning, to facilitate efficient formation of the array 1103 thereupon. Further, the array 1103 can include a plurality of IMODs configured as individual display elements. In some implementations, the IMODs of the array 1103 can be manufactured in accordance with the flow diagram of FIG. 7 and the example process of FIGS. 8A-8D, prior to the release of the sacrificial layer 25 of FIG. 8E, or the cavity formation block 90 of FIG. 7, for example.

Figure 11B:
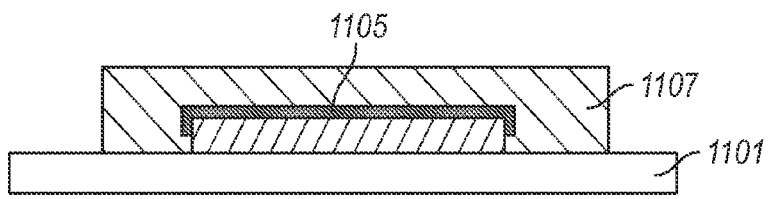

FIG. 11B illustrates the array 1103 and front substrate layer 1101 of FIG. 11A with a sacrificial layer 1105 deposited over the array 1103 and a first passivation layer 1107 deposited over the sacrificial layer 1105 and the front substrate layer 1101. The sacrificial layer 1105 can include the same material as the sacrificial layer 25, for example, a xenon difluoride ($XeF_2$)-etchable such as Mo or a-Si. The first passivation layer 1107 can include a corrosion resistant material, for example, silicon oxide ($SiO_x$), silicon oxynitride (SiON), silicon nitride (SiN), or any inorganic material with a low water permeation rate. Deposition of the sacrificial layer 1105 and/or first passivation layer 1107 can be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 11C:
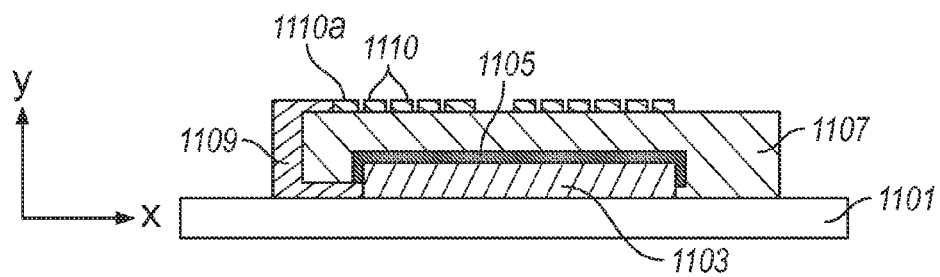

FIG. 11C illustrates a connection pad 1109 that has been deposited and electrically coupled to the array 1103. The connection pad 1109 can include conductive materials, for example, metals or alloys. In some implementations, the connection pad 1109 includes aluminum (Al), aluminum copper (AlCu), aluminum silicon (AlSi), molychrome (MoCr), gold (Au), copper (Cu), chromium (Cr), nickel (Ni) and/or other low resistivity metals. The connection pad 1109 is also electrically coupled to a driver line 1110a extending below at least a portion of the array 1103 (with reference to the front substrate layer 1101). In such implementations, portions of the driver line 1110a must be electrically isolated from other driver lines 1110 to provide for discrete and separate driver lines 1110 through a series of processing steps, such as photoresist patterning, dry or wet metal etch, resist stripping. Other driver lines 1110 are also routed so as to extend at least partially below the array 1103 and can be electrically coupled to other connection pads that are electrically coupled to other portions of the array 1103 outside of the illustrated cross-section. In this way, the driver lines 1110 can be routed below the array 1103 to reduce the routing borders on the lateral sides of the array 1103 as compared with routing the driver lines 1110 on lateral sides of the array 1103 to connection pads. In some implementations, the driver lines 1110 can include aluminum (Al), aluminum alloys and/or any low resistivity metal.

Figure 11D:
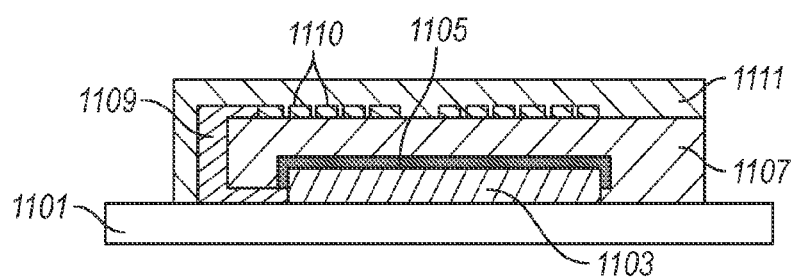
Figure 11E:
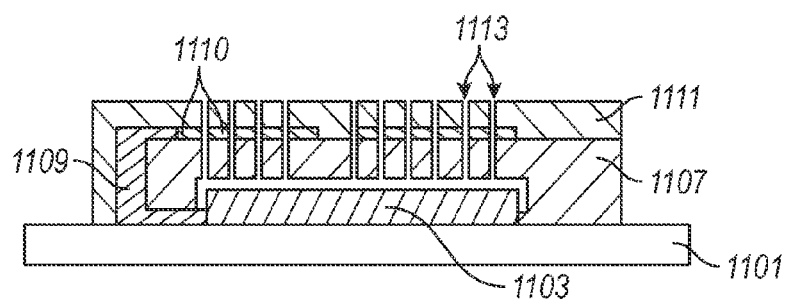

FIG. 11D illustrates a second passivation layer 1111 deposited above the driver lines 1110, connection pad 1109 and front substrate layer 1101. The second passivation layer 1111 can include the same material as the first passivation layer 1107 or a different corrosion resistant material. As shown in FIG. 11E, the second passivation layer 1107 can be patterned and etched to create release holes 1113 through the first passivation layer 1107 and second passivation layer 1111. The sacrificial layer 1105 can be released simultaneously with the sacrificial layer 25 through the release holes 1113 resulting in a space between the array 1103 and the first passivation layer 1107, as shown.

Figure 11F:
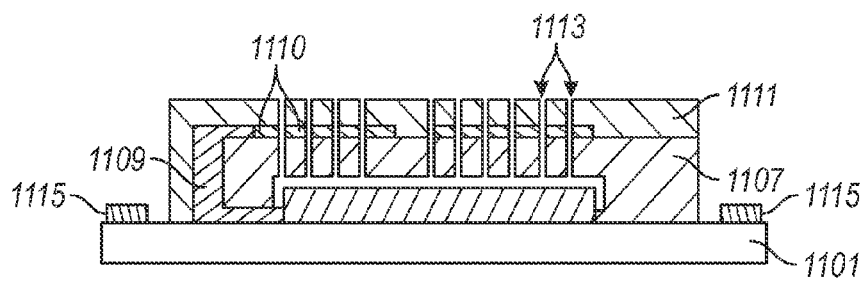

Turning now to FIG. 11F, in some implementations, the array 1103 may be hermetically sealed within an encapsulation housing. As part of the sealing process, a seal ring 1115 may be deposited upon the front substrate layer 1101 circumferentially around the array 1103. In some implementations, the seal ring 1115 can be deposited after an anti-stiction coating is deposited on the substrate layer 1101 and selectively removed at a location which the seal ring 1115 is to be deposited. In some implementations, the anti-stiction coating can include hydrocarbon or fluorocarbon chlorosilane-based self assembled monolayers (SAMs). In some implementations, the seal ring 1115 includes gold (Au), silver (Ag), or any metal suitable for eutectic soldering. Once the seal ring 1115 has been deposited around the array 1103, a back portion of the encapsulation housing for the array 1103 can be coupled to the seal ring 1115.

Figure 11G:
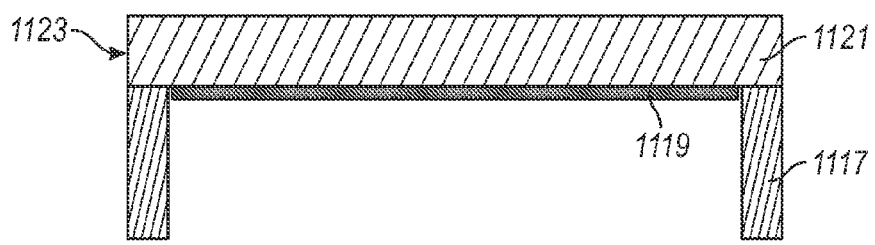
Figure 11H:
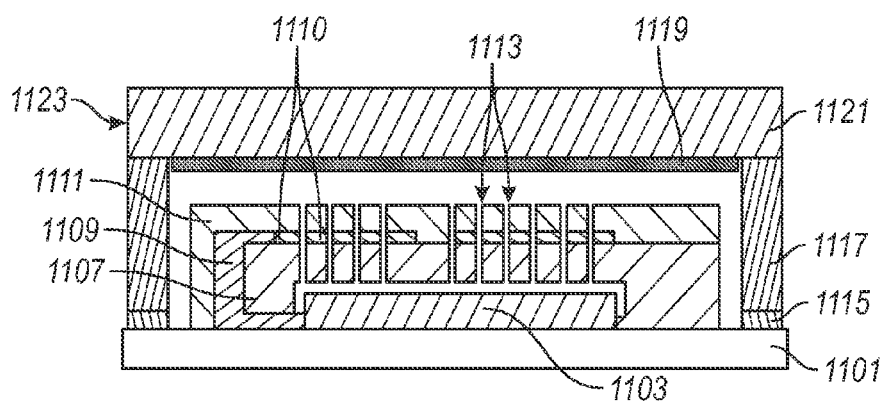

FIG. 11G illustrates a portion of the encapsulation housing 1123 for the array 1103. In some implementations, the encapsulation housing 1123 can include a horizontally extending back substrate layer 1121 and a downwardly extending ring 1117. An optional desiccant material 1119 may be disposed coupled to the back substrate layer 1121 within the ring 1117. In some implementations, the ring 1117 can be made from indium (In) or tin (Sn) eutectic solders. In some implementations, the back substrate layer 1121 can be made of glass, plastic, stainless steel or any corrosion resistant material with a low water permeation rate and sufficient mechanical strength for reliability and touch damage consideration of an EMS device. As shown in FIG. 11H, the ring 1117 may be coupled to the seal ring 1115 to hermetically seal the array 1103 between the ring 1117, seal ring 1115, front substrate layer 1101 and back substrate layer 1121. From this configuration, one or more circuit drivers (not shown) may be electrically coupled to the driver lines 1110 to provide signals to columns and/or rows of the array 1103 via the connection pads. In some implementations, the driver lines 1110 under the seal ring 1115 can be electrically isolated from the seal ring 1115 with inorganic or organic materials (not shown).

Figure 12A:
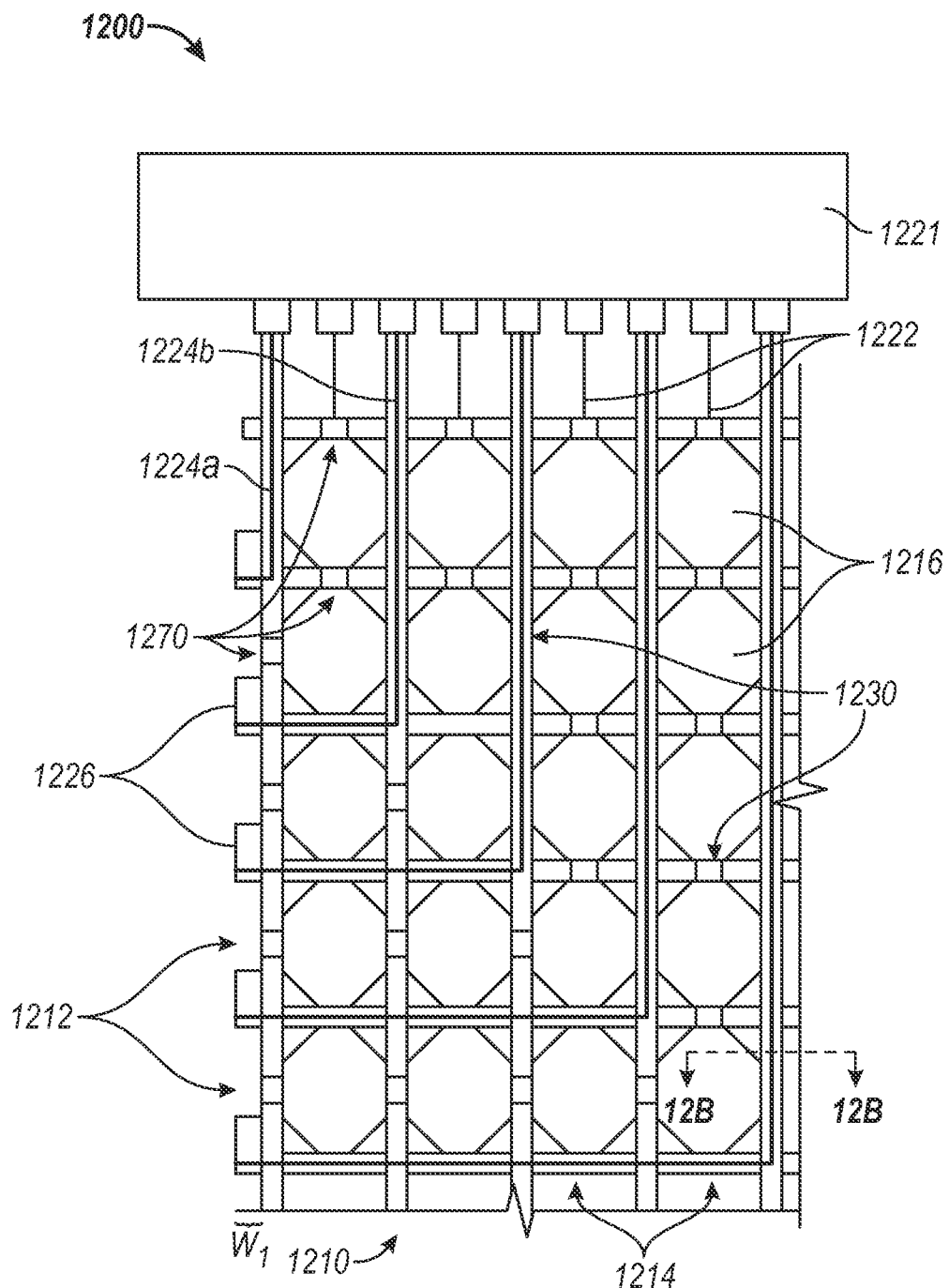
FIG. 12A shows an example of a partial top plan view of an EMS device including an array of display elements, a driver circuit and a plurality of driver lines routed at least partially above the array through a conductive optical mask structure.

As discussed above, in some implementations, an EMS device can include a an optical mask structure (e.g., a black mask structure) formed in optically inactive regions between display elements or pixels to absorb ambient or stray light. The optical mask structure can improve the optical properties of a display device by inhibiting light from being reflected from or transmitted through inactive portions of the display, thereby increasing the contrast ratio. FIG. 12A shows an example of a partial top plan view of an EMS device 1200 including an array 1210 of display elements 1216, a driver circuit 1221 and a plurality of driver lines 1224 routed at least partially above the array 1210 through a conductive optical mask structure 1230. As shown, the plurality of driver lines 1224 may be electrically coupled to connection pads 1226 disposed at the ends of rows 1212 of the array 1210 so as to electrically couple the driver circuit 1221 with the rows 1212. The EMS device 1200 also can include a plurality of driver lines 1222 routed between the columns 1214 of the array 1210 and the driver circuit 1221. In this way, the driver circuit 1221 can apply a signal to one or more rows 1212 and one or more columns 1214 to drive one or more display elements 1216 of the array 1210.

In some implementations, the optical mask structure 1230 is disposed in between display elements 1216 above the array 1210 (e.g., on a side of the array 1210 that is closest to a viewer of the EMS device 1200). In this way, the driver lines 1224 can be routed at least partially above or over the array 1210 to the connection pads 1226. As a result of this routing configuration, the routing border $W_1$ for the driver lines 1224 is limited to the width of the connection pads 1226. Thus, the space required for routing the driver lines 1224 is less than if the driver lines 1224 were to be routed on the sides of the array 1210 as opposed to above or over the array 1210. Although in FIG. 12A the driver lines 1224 are illustrated as being disposed over non-active areas of the array 1210 (e.g., between display elements 1216), in some implementations, driver lines 1224 may be routed at least partially over active areas of the array 1210 (e.g., over one or more display elements 1216). In such implementations, at least a portion of the driver lines 1224 also may be routed at least partially over one or more non-active areas of the array 1210.

Still referring to FIG. 12A, in some implementations, the optical mask structure 1230 provides the conductive paths for the driver lines 1224. In other words, the structure of the optical mask structure 1230 can be used to electrically couple the driver circuit 1221 to the connection pads 1226. As discussed below, in some implementations the optical mask structure 1230 can include one or more conductive layers which may be electrically coupled to the connection pads 1226 and the driver circuit 1221 to provide an electrical path therebetween. In such implementations, portions of the optical mask structure 1230 must be electrically isolated from one another to provide for discrete and separate driver lines 1224 through the optical mask structure 1230. To electrically isolate portions of the optical mask structure 1230, non-conductive spaces or voids 1270 can be disposed in the optical mask structure 1230 to provide for breaks between portions of the optical mask structure 1230 which may be utilized as separate driver lines 1224. For example, as illustrated, a first driver line 1224*a* may extend at least partially through the optical mask structure 1230 and a second driver line 1224*b* may extend at least partially through the optical mask structure 1230. The portion of the optical mask structure 1230 that forms at least a portion of the first driver line 1224*a* can be electrically isolated from the portion of the optical mask structure 1230 that forms at least a portion of the second driver line 1224*b* by non-conductive spaces 1270 disposed in the optical mask structure. In this way, the optical mask structure 1230 can improve optical properties of the EMS device 1200 as discussed above while providing the structure for the routing of driver lines 1224 over the array 1210 between the driver circuit 1221 and the connection pads 1226. In such implementations, the optical mask structure 1230 can be formed so as to incorporate isolated driver lines 1224 without requiring an additional deposition step.

Figure 12B:
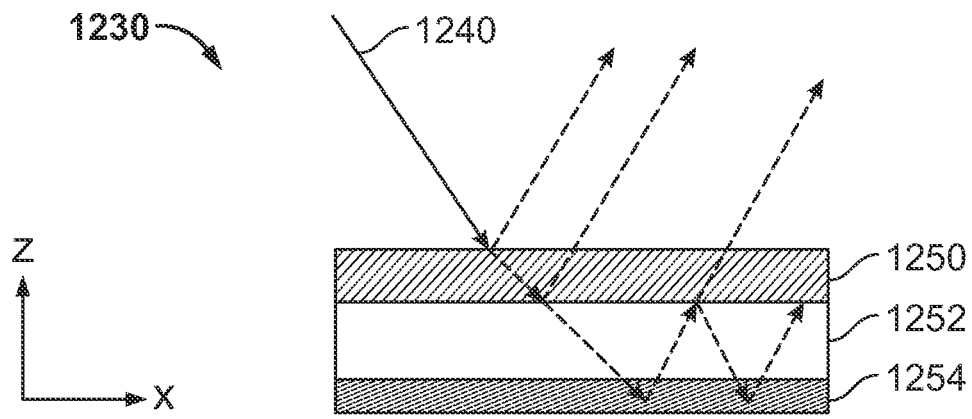
FIG. 12B shows an example of a cross-sectional view of the EMS device of FIG. 12A taken along line 12B-12B.

FIG. 12B shows an example of a cross-sectional view of the optical mask structure 1230 of the EMS device 1200 of FIG. 12A taken along line 12B-12B. The optical mask structure 1230 can include an absorber layer 1250, a spacer layer 1252 and a reflective layer 1254. The spacer layer 1252 can be formed between the absorber layer 1250 and the reflective layer 1254.

In some implementations, a portion of light 1240 which strikes the absorber layer 1250 is reflected by the absorber layer 1250 and another portion of the light 1240 is transmitted through the absorber layer 1250. The portion of the light 1240 that is transmitted through the absorber layer 1250 propagates through the spacer layer 1252 and is reflected by the reflective layer 1254 back through the spacer layer 1252 towards the absorber layer 1250, and can create a standing wave having local peaks and nulls. The location of the peaks and nulls of the light can depend at least in part on the wavelength of the light. For a particular wavelength of light being reflected by the reflective layer 1254, the absorber layer 1250 (for example, 6 nm layer of chromium (Cr)) can be placed at a null position with respect to a standing wave to absorb very little energy of the particular wavelength of light, but the absorber layer 1250 will absorb more energy of other wavelengths of light having (such as light having wavelengths that are not at the null). At least a portion of the reflected light that is not absorbed passes through the absorber layer 1250 and appears as colored light reflected from the device.

Suitable materials for the reflective layer 1254 can include molybdenum (Mo) and/or aluminum (Al). The reflective layer 1254 can be of a sufficient thickness to substantially reflect visible light. In some implementations, the reflective layer 1254 can have a thickness between approximately 500 Angstroms and 6,000 Angstroms. In some implementations, the spacer layer 1252 is made from a transparent conductive material, such as indium tin oxide (ITO), zinc oxide (ZnO), indium gallium zinc oxide (InGaZnO), etc. In some other implementations, the spacer layer 1252 is made from a transparent insulating material, such as silicon dioxide ($SiO_2$). The spacer layer 1252 can be of a sufficient thickness to form an interferometric cavity between the absorber layer 1250 and reflective layer 1254 that interferometrically modulates light to non-visible wavelengths. In some implementations, the spacer layer 1252 can have a thickness between approximately 400 Angstroms and 1000 Angstroms. Suitable materials for the absorber layer 1250 include, for example, chromium (Cr) and molychrome (MoCr). The absorber layer 1250 can be of a sufficient thickness to substantially absorb light. In some implementations, the absorber layer 1250 can have a thickness between approximately 30 Angstroms and 80 Angstroms. As discussed above with reference to FIG. 1, the materials and dimensions of the absorber layer 1250, the spacer layer 1252 and the reflective layer 1254 can be selected so as to interferometrically modulate light that is incident on the optical mask structure 1230 to limit a reflectance of visible light therefrom. For example, in some implementations, the optical mask structure 1230 can be configured similar to the black mask 23 discussed above with reference to FIG. 6D.

Figure 13:
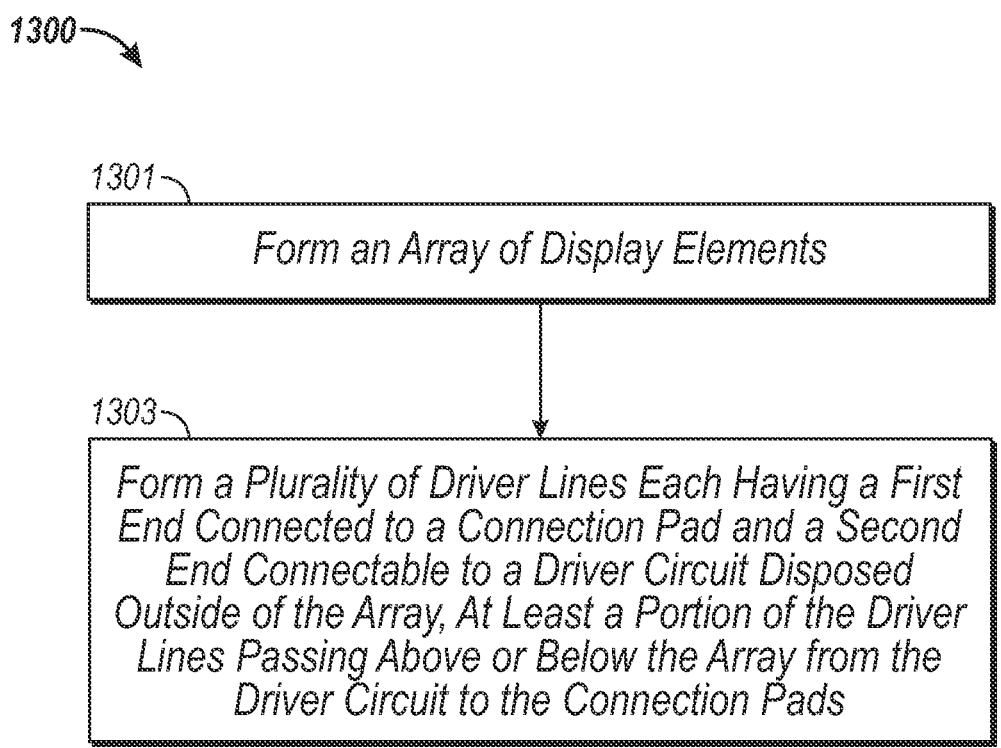
FIG. 13 shows a flow diagram illustrating an example method of manufacturing an apparatus.

FIG. 13 shows a flow diagram illustrating an example method 1300 of manufacturing an apparatus. The method 1300 can be used to manufacture an EMS device having a plurality of driver lines routed above or below an array between a driver circuit and a plurality of connection pads. For example, the method 1300 can be used to manufacture the EMS devices of FIGS. 10A-12B, discussed above.

As shown in block 1301, the method 1300 includes forming an array of display elements. In some implementations, forming the array of display elements can include forming a plurality of movable layers disposed in rows and a plurality of stationary electrodes disposed in columns. As noted above, a person having ordinary skill in the art will readily understand that referring to one direction as a "row" and another as a "column" is arbitrary. Thus, the movable layers can be disposed in other orientations than horizontal line segments and the stationary electrodes can be disposed in other orientations than vertical line segments. In some implementations, the array of display elements can be manufactured in accordance with the flow diagram of FIG. 7. Forming the array of display elements also can include forming an electrical connection pad at an end of each row.

Turning now to block 1303, in some implementations, the method 1300 can include forming a plurality of driver lines each having a first end connected to a connection pad and a second end connectable to a driver circuit disposed outside of the array and at least a portion of the driver lines can pass above or below the array from the driver circuit to the connection pads. As a result of forming the plurality of driver lines as provided in block 1303, a routing border of the EMS device manufactured using the method 1300 can be less than a similar EMS device where the driver lines are routed alongside the array as opposed to at least partially above or below the array. In this way, EMS devices manufactured using the method 1300 can have reduced routing borders similar to the devices of FIGS. 10A-12B.

In some implementations, the method 1300 can be used to manufacture an EMS device having at least a portion of the driver lines passing above the array from the driver circuit to the connection pads. In such implementations, at least a portion of the plurality of driver lines can be formed in a non-active area of the array on the same side of the movable layers as the stationary electrodes. For example, the method 1300 can optionally include forming an electrically conductive optical mask structure over the array and extending between at least some of the display elements to mask non-active areas of the display and forming the optical mask structure can include forming a portion of at least one of the plurality of driver lines. In this way, the method 1300 can be used to manufacture the EMS device 1200 of FIG. 12A, for example.

In other implementations, the method 1300 can be used to manufacture an EMS device having at least a portion of the driver lines passing below the array from the driver circuit to the connection pads. For example, the plurality of driver lines can optionally be formed such that the plurality of movable layers are formed between the stationary electrodes and at least a portion of the plurality of driver lines. In this way, the method 1300 also can be used to manufacture the EMS devices 1000a and 1000b of FIGS. 10A and 10B, for example.

Figure 14A:
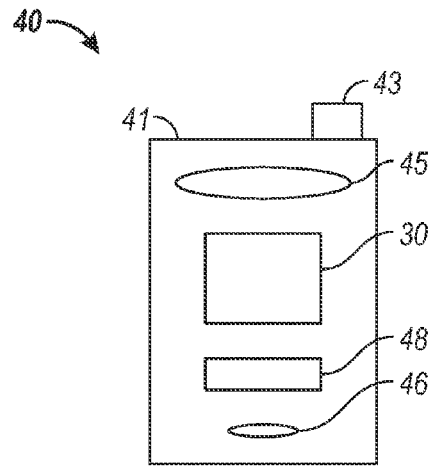
FIGS. 14A and 14B show examples of system block diagrams illustrating a display device that includes a plurality of IMODs.
Figure 14B:
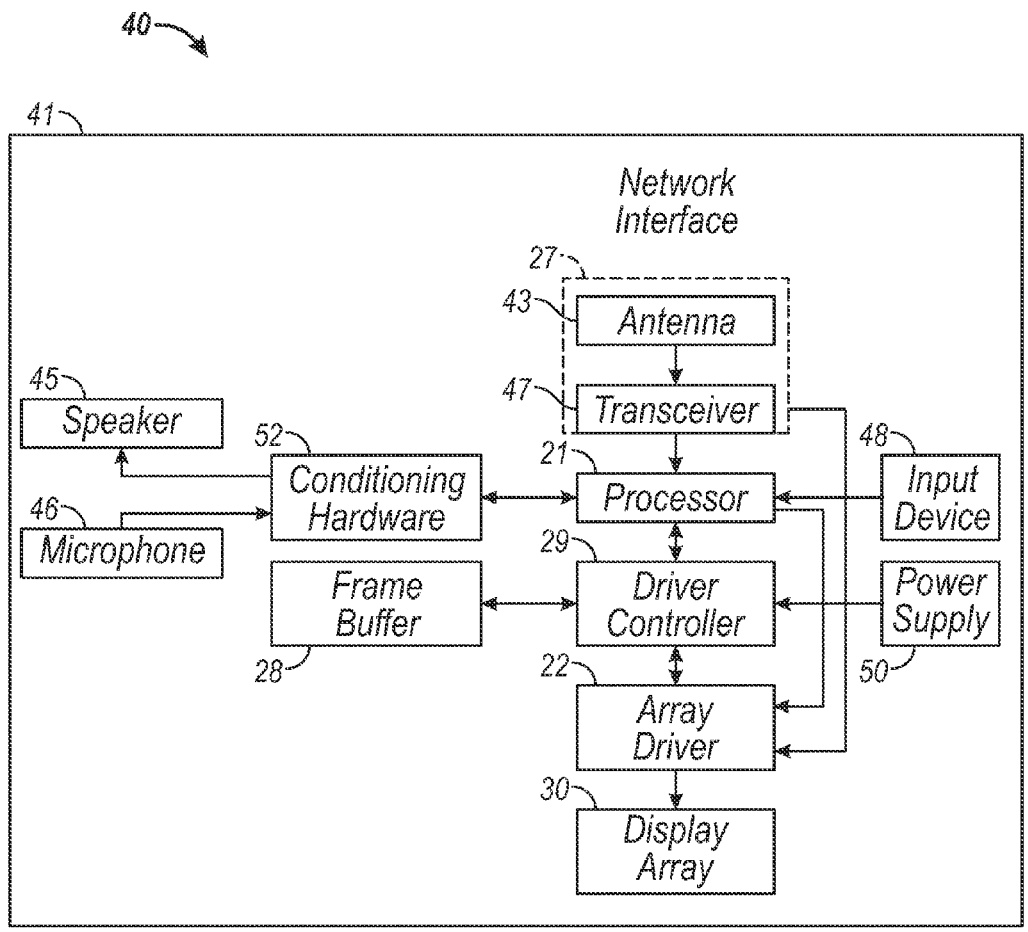

FIGS. 14A and 14B show examples of system block diagrams illustrating a display device 40 that includes a plurality of IMODs. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48 and a microphone 46. The housing 41 can be formed from any of a variety of manufacturing processes, including injection molding and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD display, as described herein.

The components of the display device 40 are schematically illustrated in FIG. 14B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
   an array of display elements defining an array footprint, the array of display elements including:
   a plurality of movable layers extending in a first direction and a plurality of stationary electrodes extending in a second direction, the plurality of movable layers and stationary electrodes forming a portion of a plurality of the display elements;

a plurality of electrical connection pads, each connection pad disposed at an end of a movable layer; and
a plurality of driver lines each having a first end connected to a connection pad and a second end connectable to a driver circuit,
wherein at least a portion of the plurality of driver lines is routed within the array footprint above or below the array of display elements.

2. The apparatus of claim 1, wherein at least a portion of the plurality of driver lines is disposed above a non-active area of the array of display elements, and wherein the stationary electrodes are disposed between the movable layers and the portion of the plurality of driver lines disposed over the non-active area of the array of display elements.

3. The apparatus of claim 1, wherein at least a portion of the plurality of driver lines is disposed over an active area of the array of display elements.

4. The apparatus of claim 2, further comprising an electrically conductive optical mask structure disposed over the array of display elements and extending between at least some of the display elements to mask non-active areas of the display, wherein the optical mask structure forms a portion of at least one of the plurality of driver lines.

5. The apparatus of claim 4, wherein the optical mask structure includes a film stack including a conductive first reflective layer, a conductive second reflective layer, and a non-conductive layer disposed between the first reflective layer and the second reflective layer forms a portion of at least one of the plurality of driver lines.

6. The apparatus of claim 4, wherein the optical mask structure includes at least one non-conductive space to electrically isolate the at least one driver line formed by the optical mask structure from the rest of the optical mask structure.

7. The apparatus of claim 1, wherein the plurality of movable layers is disposed between the plurality of stationary electrodes and at least a portion of the plurality of driver lines.

8. The apparatus of claim 7, further comprising at least one passivation layer, wherein at least a portion of the plurality of driver lines is disposed over the at least one passivation layer.

9. The apparatus of claim 1, further comprising a driver circuit connected to the second end of the plurality of driver lines and configured to send signals to the movable layers through the plurality of driver lines.

10. The apparatus of claim 1, further comprising:
a processor that is configured to communicate with the array of display elements, the processor being configured to process image data; and
a memory device that is configured to communicate with the processor.

11. The apparatus of claim 10, further comprising:
a driver circuit configured to send at least one signal to the array of display elements; and
a controller configured to send at least a portion of the image data to the driver circuit.

12. The apparatus of claim 10, further comprising an image source module configured to send the image data to the processor, wherein the image source module includes at least one of a receiver, transceiver, and transmitter.

13. The apparatus of claim 12, further comprising an input device configured to receive input data and to communicate the input data to the processor.

14. An apparatus comprising:
an array of display elements defining an array footprint, the array of display elements including:
a plurality of movable layers extending in a first direction and a plurality of stationary electrodes extending in a second direction, the plurality of movable layers and stationary electrodes forming a portion of a plurality of the display elements;
a plurality of electrical connection pads, each connection pad disposed at an end of a movable layer; and
a plurality of means for electrically connecting each of the plurality of movable layers to a driver circuit, each electrical connection means being electrically connected to a connection pad and connectable to a driver circuit,
wherein at least a portion of the plurality of electrical connection means is routed within the array footprint above or below the array of display elements.

15. The apparatus of claim 14, wherein the plurality of electrical connection means include a plurality of driver lines each having a first end connected to a connection pad and a second end connectable to the driver circuit.

16. A method of manufacturing an apparatus, comprising:
forming an array of display elements defining an array footprint, wherein forming the array of display elements includes:
forming a plurality of movable layers extending in a first direction and a plurality of stationary electrodes extending in a second direction;
forming an electrical connection pad at an end of each movable layer; and
forming a plurality of driver lines each having a first end connected to a connection pad and a second end connectable to a driver circuit, wherein at least a portion of the driver lines passes within the array footprint above or below the array of display elements.

17. The method of claim 16, wherein at least a portion of the plurality of driver lines is formed above a non-active area of the array of display elements, and wherein the stationary electrode are disposed between the movable layers and the portion of the plurality of driver lines disposed over the non-active area of the array of display elements.

18. The method of claim 17, further comprising forming an electrically conductive optical mask structure over the array of display elements and extending between at least some of the display elements to mask non-active areas of the display, wherein forming the optical mask structure includes forming a portion of at least one of the plurality of driver lines.

19. The method of claim 18, wherein forming the optical mask structure includes forming a film stack including a conductive first reflective layer, a conductive second reflective layer, and a non-conductive layer disposed between the first reflective layer and the second reflective layer, and wherein forming the least one of the plurality of driver lines includes forming the first reflective layer or second reflective layer.

20. The method of claim 18, wherein forming the optical mask structure includes forming at least one non-conductive space to electrically isolate the at least one driver line formed by the optical mask structure from the rest of the optical mask structure.

21. The method of claim 16, wherein the plurality of movable layers is formed between the stationary electrodes and at least a portion of the plurality of driver lines.

22. The method of claim 16, further comprising electrically connecting the second ends of the plurality of driver lines to a driver circuit, the driver circuit being configured to send signals to the movable layers through the plurality of driver lines.

23. The method of claim 16, further comprising forming a sacrificial layer over the plurality of movable layers, and wherein forming the plurality of driver lines includes forming the portion of the driver lines that passes above or below the array of display elements over the sacrificial layer.

24. The method of claim 16, further comprising encapsulating the array of display elements between a first substrate and a second substrate.

* * * * *